United States Patent [19]

Smutny et al.

[11] Patent Number: 4,775,708

[45] Date of Patent: Oct. 4, 1988

[54] LINEAR ALTERNATING POLYMER OF CARBON MONOXIDE AND OLEFIN PLASTICIZED WITH ALKYLENE CARBONATE

[75] Inventors: Edgar J. Smutny, Houston, Tex.; Thomas E. Kiovsky, Solon, Ohio

[73] Assignee: Shell Oil Company, Houston, Tex.

[21] Appl. No.: 102,466

[22] Filed: Sep. 29, 1987

[51] Int. Cl.$^4$ .................... C08L 65/00; C08L 87/00
[52] U.S. Cl. .................... 524/108; 524/111; 528/392
[58] Field of Search ............... 524/108, 111; 528/392

[56] References Cited

U.S. PATENT DOCUMENTS

| 3,689,460 | 9/1972 | Nozaki | 260/63 |
| 3,694,412 | 9/1972 | Nozaki | 260/63 |

FOREIGN PATENT DOCUMENTS

| 0121965 | 8/1984 | European Pat. Off. |
| 0181014 | 5/1986 | European Pat. Off. |
| 1081304 | 3/1965 | United Kingdom |

Primary Examiner—Harold D. Anderson

[57] ABSTRACT

Plasticized polymeric compositions comprising a polyketone polymer and a plasticizing amount of an alkylene carbonate are produced by contacting a solution of the polymer with a solution of the alkylene carbonate wherein the solvent for the alkylene carbonate is a non-solvent for the polymer.

16 Claims, No Drawings

LINEAR ALTERNATING POLYMER OF CARBON MONOXIDE AND OLEFIN PLASTICIZED WITH ALKYLENE CARBONATE

FIELD OF THE INVENTION

This invention relates to the class of linear alternating polymers of carbon monoxide and at least one ethylenically unsaturated hydrocarbon and particularly to novel plasticized compositions of the polymers. Additionally, the invention relates to a method for the production of the novel compositions.

BACKGROUND OF THE INVENTION

The class of polymers of carbon monoxide and olefin(s), often referred to as polyketones, has been known for a number of years. Brubaker, U.S. Pat. No. 2,495,286 produced such polymers of relatively low carbon monoxide content in the presence of free radical initiators such as benzoyl peroxide. British Published Patent Specification No. 1,081,304 produced such polymers in the presence of alkylphosphine complexes of palladium salts as catalysts. Nozaki, U.S. Pat. No. 3,694,412, extended the process through the use of arylphosphine complexes of palladium salts and certain inert solvents.

Particularly useful copolymers and terpolymers of carbon monoxide with at least one ethylenically unsaturated compound, e.g., ethylene or ethylene and propylene, have been shown to be linear alternating polymers of the formula —CO(A)— where A is the moiety obtained by polymerization of the ethylenically unsaturated hydrocarbon through the ethylenic unsaturation. For example, copolymers of carbon monoxide and ethylene are of the formula —CO(CH$_2$CH$_2$)—. The general process for the production of these linear alternating polymers is illustrated by published European Patent Application Nos. 181,014 and 121,965. The process generally involves the use of a catalyst formed from a Group VIII metal compound wherein the metal is palladium, cobalt or nickel, the anion of a non-hydrohalogenic acid having a pKa below 2 and a bidenate ligand of phosphorus, arsenic or antimony. The resulting polymers are generally high molecular weight thermoplastic polymers having utility in the production of structural articles such as containers for food and drink and parts for the automobile industry. The relatively high melting point of the polyketone polymers is of value in many applications, e.g., where a resulting shaped article is to be subjected to conditions of elevated temperature. For other applications, however, high temperature stability is not required and it would be of value to provide plasticized compositions of polyketone polymers with reduced melting temperatures.

SUMMARY OF THE INVENTION

The present invention relates to plasticized compositions comprising linear alternating copolymers or terpolymers of carbon monoxide with one or more ethylenically unsaturated hydrocarbons, which compositions incorporate a quantity of an alkylene carbonate sufficient to plasticize the polyketone polymer. In addition, the invention relates to a method of producing the plasticized compositions.

DESCRIPTION OF THE INVENTION

The polymers which are plasticized according to the process of the invention are linear alternating polymers of carbon monoxide and at least one ethylenically unsaturated hydrocarbon. Suitable ethylenically unsaturated hydrocarbons have from 2 to 20 carbon atoms inclusive, preferably from 2 to 10 carbon atoms inclusive, and are aliphatic such as ethylene and other α-olefins including propylene, butene-1, octene-1 and dodecene-1 or are arylaliphatic containing an aryl substituent in an otherwise aliphatic molecule, particularly an aryl substituent on a carbon atom of the ethylenic unsaturation. Illustrative of this latter case of olefins are styrene, p-methylstyrene, p-ethylstyrene and m-methylstyrene. Preferred polyketone polymers are copolymers of carbon monoxide and ethylene or terpolymers of carbon monoxide, ethylene and a second α-olefin, particularly propylene.

Of particular interest are those polymers of molecular weight from about 1,000 to about 200,000, particularly those of molecular weight from about 10,000 to about 50,000, and containing substantially equimolar quantities of carbon monoxide and hydrocarbon.

Such polymers are produced by contacting carbon monoxide and the ethylenically unsaturated hydrocarbon(s) under polymerization conditions in the presence of a catalytic amount of a catalyst formed from a compound of the Group VIII metals palladium, cobalt or nickel, an anion of a non-hydrohalogenic acid of a pKa less than about 6, preferably less than about 2, and a bidentate ligand of phosphorus, arsenic or antimony. Although the scope of the polymerization process is extensive, for purposes of illustration the preferred Group VIII metal compound is palladium acetate, the anion is the anion of an acid selected from trifluoroacetic acid and p-toluenesulfonic acid and the bidentate ligand is 1,3-bis(diphenylphosphino)propane.

Polymerization is carried out at elevated temperature and pressure and in the gaseous phase or in the liquid phase in the presence of a liquid diluent, e.g., methanol or ethanol. The reactants are contacted by conventional methods such as by shaking or stirring and subsequent to reaction the polymer product is recovered as by filtration or decantation. The polymer product may contain metal residues from the catalyst which are removed, if desired, by contact with a solvent selective for the residues. Production of this class of polymers is illustrated, for example, by Published European Patent Application Nos. 181,014 and 121,965.

The physical properties of the polymer will be determined in part by molecular weight and whether the polymer is a copolymer or a terpolymer. Typical melting points are from about 175° C. to about 300° C., more frequently from about 210° C. to about 260° C. The structure of the preferred polymers is that of a linear alternating copolymer of carbon monoxide, ethylene and any second ethylenically unsaturated hydrocarbon. The polymer will contain substantially one carbon monoxide moiety for each moiety of unsaturated hydrocarbon. When terpolymers of carbon monoxide, ethylene and a second hydrocarbon i.e. a hydrocarbon at least 3 carbon atoms, are produced there will be at least about 2 units incorporating a moiety of ethylene per unit incorporating a moiety of the second unsaturated hydrocarbon, preferably from about 10 to about 100 units incorporating moieties of ethylene per unit incorporating a moiety of second unsaturated hydrocarbon. The polymer chain of the preferred class of polymer products is thus illustrated by the formula

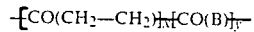

wherein B is the moiety obtained by polymerization through the ethylenic unsaturation of the second ethylenically unsaturated hydrocarbon. The —CO(CH$_2$—CH$_2$)— units and the —CO(B)— units are found randomly throughout the polymer chain, and the ratio of y:x is no more than about 0.5:1. In the modification of the invention which employs copolymers of carbon monoxide and ethylene without units of a second ethylenically unsaturated hydrocarbon, the polymers are represented by the above formula wherein y=0. When y is other than 0, ratios of y:x from about 0.01 to about 0.1 are preferred.

The plasticized compositions of the invention comprise the above polymers having intimately mixed therewith a plasticizing quantity of an alkylene carbonate. Illustrative of suitable alkylene carbonates are those vic-carbonyldioxyalkanes of up to 23 carbon atoms, particularly up to 11 carbon atoms, represented by the formula

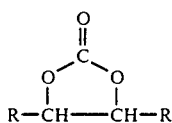

wherein R independently is hydrogen or alkyl of up to 10 carbon atoms. The R group, when alkyl, is straight chain or branched chain and is illustrated by methyl, ethyl, propyl, i-butyl, i-amyl, octyl and decyl. Suitable alkylene carbonates include ethylene carbonate (carbonyldioxyethane), propylene carbonate (1,2-carbonyldioxypropane), 2,3-carbonyldioxybutane, 1,2-carbonyldioxyhexane and 4,5-carbonyldioxyoctane. Preferred alkylene carbonates are those wherein the carbonyldioxy group is attached to a primary, e.g., terminal, carbon atom and the carbon atom adjacent thereto. A preferred class of alkylene carbonates comprises those alkylene carbonates of up to 4 carbon atoms, i.e., ethylene carbonate and propylene carbonate, and ethylene carbonate is a particularly preferred plasticizer for the compositions of the invention.

The plasticized polymer compositions are obtained by intimately mixing the alkylene carbonate throughout the polyketone polymer. The amount of alkylene carbonate can be varied, and the properties of the resulting composition will depend in part upon the proportion of plasticizer it contains. Too little alkylene carbonate will result in very little melting point lowering and the objectives of incorporating a plasticizer may not be realized. On the other hand, too large an amount of plasticizer will result in a partial loss of the desirable mechanical properties of the polyketone polymer. Amounts of alkylene carbonate from about 5% by mol up to about 50% by mol, based on total composition are useful with amounts from about 10% to about 25% by mol on the same basis being preferred.

The plasticized compositions of the invention may also contain other conventional polymer additives which are inert to the polymer and alkylene carbonate plasticizer such as blowing agents, mold release agents and antioxidants which may be added by blending, milling or other conventional methods.

The method of producing the plasticized composition is of considerable importance since many of the more conventional methods of producing plasticized compositions are not effective for the sulfone-stabilized compositions of the invention. To obtain an effectively plasticized composition, the polyketone polymer and the alkylene carbonate must be intimately mixed. The preferred method of providing this degree of mixing is through a certain type of coprecipitation of the polymer and alkylene carbonate. The polymer is dissolved in a solvent for the polymer such as hexafluoroisopropanol. m-cresol or o-chlorophenol. The polymer solution is then contacted with an excess of a solution of the alkylene carbonate in a material which is a solvent for the alkylene carbonate but a non-solvent for the polymer. Such selective solvents include water, acetone or lower alcohols such as methanol or ethanol. The concentration of the polymer solution and of the alkylene carbonate solution is not critical and in both cases concentrations of solute, i.e., polymer or alkylene carbonate, from about 0.1% by weight to about 15% by weight, of solute, based on total solution, are suitable with the upper limit of concentration being limited by the solubility of the particular polymer or alkylene carbonate in the particular solvent. Largely because of solubility considerations, concentrations of polymer or alkylene carbonate from about 0.5% to about 10% by weight are preferred.

Production of the plasticized compositions is brought about by rapid contact, as by mixing, of the polymer solution and the alkylene carbonate solution. The precipitated polymer-alkylene carbonate composition is recovered by conventional methods such as filtration or decantation and is used as such or is mixed with other additives.

The plasticized polymer compositions are characterized by lower melting points or initial softening points than the polyketone polymers from which they are prepared, as well as by increased tensile strength and impact resistance. As such, the compositions are useful in thermoplastic applications not requiring treatment at high temperature but in which greater ease of processing is desired.

The invention is further illustrated but not limited by the following Comparative Experiment (not of the invention) and the following Illustrative Embodiments.

COMPARATIVE EXAMPLE I

A linear alternating copolymer of carbon monoxide and ethylene was prepared by polymerization of an equimolar mixture carbon monoxide and ethylene by conventional techniques in the presence of a catalyst formed from palladium acetate, the anion of trifluoroacetic acid and 1,3-bis(diphenylphosphino)propane. The polymer was characterized by an initial melting point of 257° C. Samples of this polymer, 1 g, were dissolved with heating in 50 ml of hexafluoroisoropyl alcohol (HFIPA) and then added to a large excess of water. The polymers which came out of solution was recovered by filtration and dried in vacuo. The initial melting point of the polymer products were raised by as much as 20° C. when compared to that of the original polymer.

ILLUSTRATIVE EMBODIMENT I (a) A sample of 1 g of polymer of Comparative Example I in 50 ml of HFIPA was prepared and then added to an excess of 5% ethylene carbonate in water. A polymer product, 1.0 g, was recovered which, upon drying, was found by NMR analysis to contain 31% by mol ethylene carbonate. The initial melting point was 221° C.

ILLUSTRATIVE EMBODIMENT II

When a sample of the polymer of Comparative Experiment I in HFIPA is prepared and then added to an excess of propylene carbonate in water, a polymer product will be recovered which, upon drying, will be found by NMR analysis to contain propylene carbonate. The melting point of the product will be below 257° C.

ILLUSTRATIVE EMBODIMENT III

Similar melting point lowerings are observed when m-cresol solutions of carbon monoxide/ethylene/propylene terpolymers are added to an excess of ethylene carbonate in water. The resulting polymer composition containing ethylene carbonate will have an initial melting point lower than that of the terpolymer.

What is claimed is:

1. A plasticized composition comprising
   (a) a linear, alternating polymer of carbon monoxide and at least one ethylenically unsaturated hydrocarbon of from 2 to 20 carbon atoms inclusive, and intimately mixed therewith,
   (b) from about 5% by weight to about 50% by weight based on total composition of an alkylene carbonate of from 3 to 23 carbon atoms inclusive.

2. The composition of claim 1 wherein the polymer is of the formula

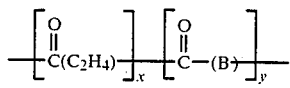

wherein B is a moiety of an ethylenically unsaturated hydrocarbon of at least 3 carbon atoms polymerized through the ethylenic unsaturation and the ratio of y:x is no more than about 0.5.

3. The composition of claim 2 wherein the alkylene carbonate is represented by the formula

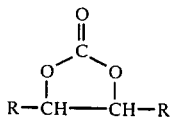

wherein R independently is hydrogen or alkyl of up to 10 carbon atoms.

4. The composition of claim 3 wherein B is a moiety of propylene.

5. The composition of claim 3 wherein y is 0.

6. The composition of claim 5 wherein the alkylene carbonate is ethylene carbonate.

7. The composition of claim 5 wherein the alkylene carbonate is propylene carbonate.

8. A process for the production of a plasticized composition which comprises intimately mixing
   (a) a linear alternating polymer of carbon monoxide and at least one ethylenically unsaturated hydrocarbon of from 2 to 20 carbon atoms inclusive, and
   (b) an alkylene carbonate of from 3 to 23 carbon atoms inclusive.

9. The process of claim 8 wherein said mixing comprises the intimate mixing of a solution of said polymer in a solvent therefor and a solution of said alkylene carbonate in a solvent for said alkylene carbonate but a non-solvent for said polymer, and recovering the resulting plasticized polymer composition.

10. The process of claim 9 wherein the polymer is of the formula

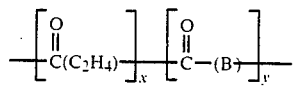

wherein B is a moiety of an ethylenically unsaturated hydrocarbon polymerized through the ethylenic unsaturation and the ratio of y:x is no more than about 0.5.

11. The process of claim 10 wherein the alkylene carbonate is represented by the formula

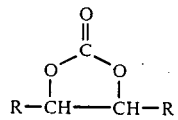

wherein R independently is hydrogen or alkyl of up to 10 carbon atoms.

12. The process of claim 11 wherein B is a moiety of propylene.

13. The process of claim 11 wherein y is 0.

14. The process of claim 13 wherein the solvent for the polymer is hexafluoroisopropyl alcohol or m-cresol and the solvent for the alkylene carbonate but non-solvent for the polymer is acetone or water.

15. The process of claim 14 wherein the alkylene carbonate is ethylene carbonate.

16. The process of claim 14 wherein the alkylene carbonate is propylene carbonate.

* * * * *